(12) United States Patent  
Park

(10) Patent No.: US 8,826,585 B2  
(45) Date of Patent: Sep. 9, 2014

(54) FISHING HOOK ASSEMBLY

(76) Inventor: Taylor Augustus Park, Chicago, IL (US)

(*) Notice: Subject to any disclaimer, the term of this patent is extended or adjusted under 35 U.S.C. 154(b) by 435 days.

(21) Appl. No.: 13/236,708

(22) Filed: Sep. 20, 2011

(65) Prior Publication Data

US 2012/0005942 A1  Jan. 12, 2012

Related U.S. Application Data

(63) Continuation-in-part of application No. 11/957,735, filed on Dec. 17, 2007, now abandoned.

(51) Int. Cl.  
*A01K 83/00* (2006.01)

(52) U.S. Cl.  
USPC .............................................. 43/43.4; 43/36

(58) Field of Classification Search  
CPC ........ A01K 83/00; A01K 83/02; A01K 85/02  
USPC ................. 43/34, 36, 43.2, 43.4, 42.4, 44.82; D22/144  
See application file for complete search history.

(56) References Cited

U.S. PATENT DOCUMENTS

| | | | | |
|---|---|---|---|---|
| 575,405 | A * | 1/1897 | Punches | 43/36 |
| 650,277 | A * | 5/1900 | Rossner | 43/36 |
| 2,124,263 | A * | 7/1938 | Schott | 43/43.2 |
| 3,331,151 | A * | 7/1967 | Turrentine | 43/43.2 |
| 3,727,340 | A * | 4/1973 | Harris | 43/43.2 |
| 4,283,877 | A * | 8/1981 | Onstott et al. | 43/34 |
| D297,253 | S * | 8/1988 | Pride | D22/144 |

* cited by examiner

*Primary Examiner* — Kimberly Berona  
(74) *Attorney, Agent, or Firm* — Joseph A. Yosick

(57) ABSTRACT

A fishing hook assembly includes a base, a central axis extending through the base, and a first, second, and third hook member moveably connected to the base. Each hook member includes a shaft connected to the base and extending therefrom, an arm connected to the shaft at a bend and forming an obtuse angle with the shaft, and an engagement portion connected to the arm and including an engagement point, wherein the arm and the engagement portion connect at an acute angle. The hook assembly is moveable from a first configuration to a second configuration.

20 Claims, 8 Drawing Sheets

US 8,826,585 B2

FISHING HOOK ASSEMBLY

CROSS-REFERENCE TO RELATED APPLICATIONS

This application is a continuation-in-part of U.S. application Ser. No. 11/957,735 filed Dec. 17, 2007, now abandoned the contents of which are incorporated herein by reference in its entirety.

FIELD OF THE INVENTION

The present invention relates to a fishing hook assembly, and in particular a weedless fishing hook assembly.

BACKGROUND

The habitat of certain fish includes bodies of water that are populated with weeds or other growth. The largemouth bass, for example, which is one of the most popular sport game fish in the world, is notorious among fishermen for hiding in thick weeds and congested areas. Such areas may also include submerged tress, stumps, rocky formations, and so forth. Other predatory game fish show similar "hide and ambush" behavior.

There are several lure designs, such as crank baits, spinner baits, and spoons, which work in catching fish. A crank bait, for example, includes a body that resembles a prey fish along with the well-known treble hook design. Unfortunately, these treble hooks are prone to catching in the weeds and other formations in congested areas because they have exposed hooks. The fish hook may become so entangled that the line breaks or must be broken in order to retrieve the fishing line, resulting in a loss of the fish hook or lure.

Weedless design with a fish hook is known in the fishing field to prevent the fish hook from being caught in the weeds or other debris. Some hooks use a weedless three-hook assembly. However, the individual hooks are restrained by a string element which prevents full extension of the hooks, so that the hook ends cannot fully engage the fish. Further, the hook ends extend from the shanks at a very gradual angle that makes it easy for the fish to wiggle off the hook or hooks. Therefore, this device is not effective at engaging the fish.

Other devices disclose multiple hooks that are of the same length. These hooks do not work effectively because the hooks tend to interfere with each other when moving from a weedless configuration to a configuration for engaging the fish's mouth. The design of four hooks, for example, makes it difficult for them to engage the fish.

BRIEF SUMMARY

In various aspects, a fishing hook assembly is provided that is moveable between a weedless configuration and an engaged configuration In one aspect, a fishing hook assembly includes a base, a central axis extending through the base, and a first, second, and third hook member moveably connected to the base. Each hook member includes a shaft connected to the base and extending therefrom. An arm is connected to the shaft at a bend and forms an obtuse angle with the shaft; and an engagement portion is connected to the arm and includes an engagement point, wherein the arm and the engagement portion connect at an acute angle. Each of the shafts of the hook members has the same length. The length of the arm of the first hook member is longer than the length of the arm of the second hook member, and the length of the arm of the second hook member is longer than the length of the arm of the third hook member. The hook assembly is moveable from a first configuration to a second configuration. In the first configuration the engagement points of each of the hook members are nearly touching and are substantially disposed around a single point on the central axis and the bends of each the hook members are substantially disposed in a same plane perpendicular to the central axis. In the second configuration the shafts of each of the hook members are disposed in a tight configuration around the central axis such that the shafts are nearly touching and the arms extend outwardly from the central axis.

In another aspect, a fishing hook assembly includes a base, a central axis extending through the base, and a first, second, and third hook member moveably connected to the base. The hook members are constrained such that they are pivotally moveable substantially only through a plane defined in part by the central axis. Each hook member includes a shaft connected to the base and extending therefrom, an arm connected to the shaft at a bend and forming an obtuse angle with the shaft, and an engagement portion connected to the arm and including an engagement point. The arm and the engagement portion connect at an acute angle and each hook member further includes a valley disposed between the arm and the engagement portion. The hook assembly is moveable from a first configuration to a second configuration. In the first configuration, the engagement points of each of the hook members are nearly touching and are substantially disposed around a single point on the central axis; each of the bends of the hook members is substantially disposed in a same plane perpendicular to the central axis; and the valleys are disposed adjacent to each other and each valley is oriented on the central axis. In the second configuration, the shafts of each of the hook members are disposed in a tight configuration around the central axis such that the shafts are nearly touching and the arms extend outwardly from the central axis; each engagement point is disposed in the same plane perpendicular to the central axis; each bend is disposed adjacent the central axis; and each valley is disposed in a different plane perpendicular to the central axis.

In another aspect, a fishing hook assembly includes a base, a central axis extending through the base, and a first, second, and third hook member moveably connected to the base. Each hook member includes a shaft connected to the base and extending therefrom and generally disposed a first distance from the central axis, an arm connected to the shaft at a bend and forming an obtuse angle with the shaft, and an engagement portion connected to the arm. The arm and the engagement portion connect at an acute angle to form a valley and define a length defined by the maximum distance between the valley and the base. The engagement portion is generally disposed a second distance from the central axis. The length of the first hook member is longer than the length of the second hook member, and the length of the second hook member is longer than the length of the third hook member. The hook assembly is moveable from a first configuration to a second configuration, wherein in the first configuration the hook members are disposed adjacent the central axis such that the first distance is greater than the second distance, and in the second configuration the shafts are disposed in a tight configuration adjacent the central axis such that the shafts are nearly touching and the arms extend outwardly from the central axis, such that the first distance is less than the second distance, and wherein the hook members are constrained such that they are pivotally moveable substantially only through a plane defined in part by the central axis.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

Figure 1:
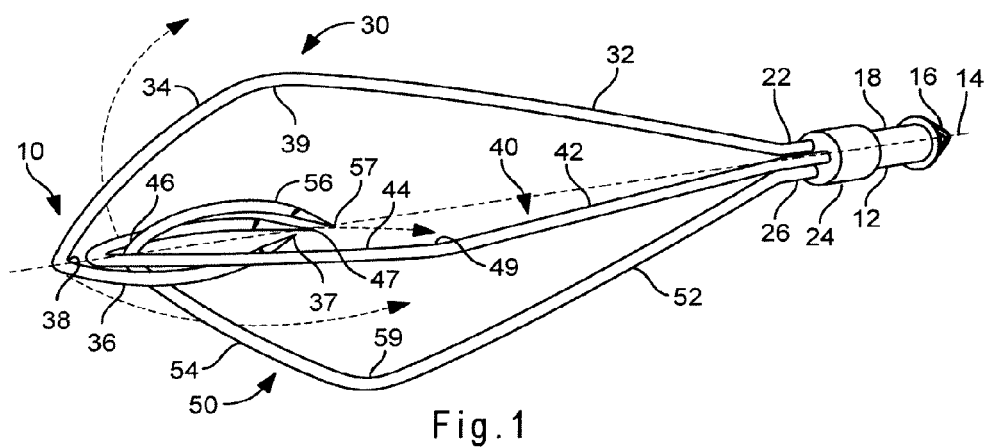
FIG. 1 is a perspective view of a fishing hook assembly in a weedless configuration.

The invention is described with reference to the drawings in which like elements are referred to by like numerals. The relationship and functioning of the various elements of this invention are better understood by the following description. Each aspect so defined may be combined with any other aspect or aspects unless clearly indicated to the contrary. The embodiments as described below are by way of example only, and the invention is not limited to the embodiments illustrated in the drawings.

FIG. 1 is a perspective view of a fishing hook assembly 10. The fishing hook assembly 10 includes a base 12 and a plurality of hook members 30, 40, 50. The device 10 includes three hook members, but other numbers are possible. A central axis 14 extends through the base 12. The hook members 30, 40, 50 are moveably connected to the base 12. The hook members 30, 40, 50 are pivotally connected to the base 12. Further, the hook members 30, 40, 50 are pivotally moveable through a plane defined in part by the central axis 14. In an embodiment, the hook members 30, 40, 50 are constrained such that they are pivotally moveable only through a plane defined in part by the central axis 14. The base 12 may include an eye 16 and a surface 18.

Hook member 30 includes a shaft 32 connected to the base 12 and extending therefrom, and generally disposed a distance from the central axis 14. An arm 34 is connected to the shaft 32 at bend 39 and forms an obtuse angle with the shaft 32. An engagement portion 36 is connected to the arm 34. The arm 34 and the engagement portion 36 connect at an acute angle such that the engagement portion 36 is oriented generally towards the base 12. Similarly, hook member 40 includes shaft 42, arm 44, bend 49, and engagement portion 46, and hook member 50 includes shaft 52, arm 54, bend 59, and engagement portion 56. Straight portions 22, 24, 26 may connect the hook members 30, 40, 50 to base 12. The hook members 30, 40, 50 may be barb-free (shown) or barbed. An advantage of the hook assembly 10 is that the hook members 30, 40, 50 do not need to be barbed in order to lodge in the fish's mouth.

Figure 2:
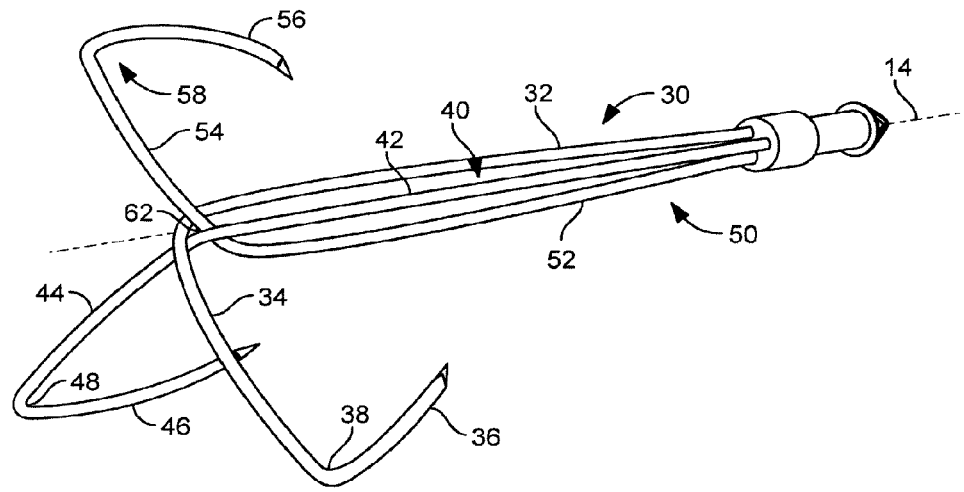
FIG. 2 is a perspective view of the fishing hook assembly of FIG. 1 in an engaged configuration.

The hook assembly 10 is moveable from a first or weedless configuration (shown in FIG. 1) to a second or engaged configuration (shown in FIG. 2). The two configurations are superimposed in FIG. 3. Using hook member 30 as an example, the tip of engagement portion 36 is generally disposed a distance L1 from the central axis 14 in the weedless configuration and a distance L2 from the central axis 14 in the engaged configuration. Similarly, shaft 30 is generally disposed a maximum distance D1 from the central axis 14 in the weedless configuration and a distance D2 from the central axis 14 in the engaged configuration. In the weedless configuration the engagement portions 36, 46, 56 are disposed adjacent the central axis 14 such that the distance D1 is greater than the distance L1. In the engaged configuration the shafts 32, 42, 52 are disposed adjacent the central axis 14 such that the distance D2 is less than the distance L2. As best seen in FIG. 2, in the engaged configuration, the shafts 32, 42, 52 are generally close to touching each other along their lengths, and may generally intersect at point 62.

Figure 3:
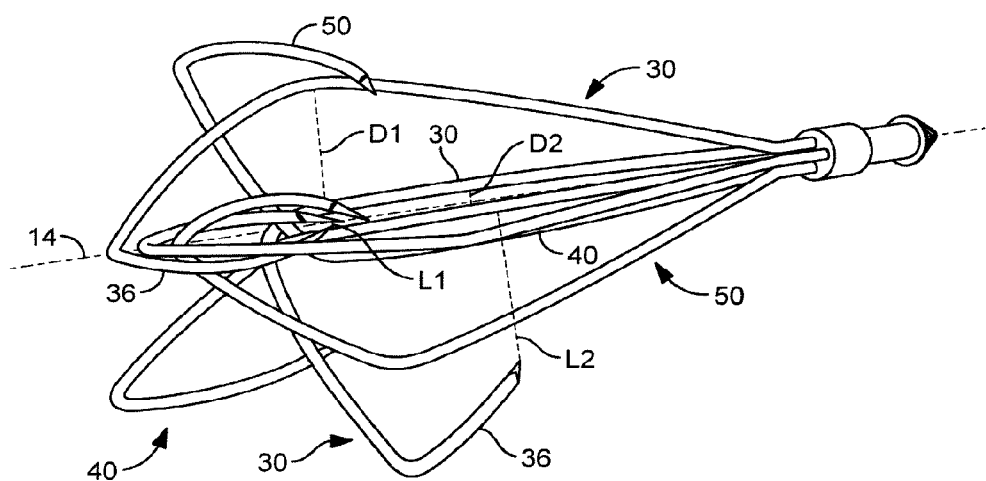
FIG. 3 is a perspective view superimposing the fishing hook of FIGS. 1 and 2.
Figure 6:
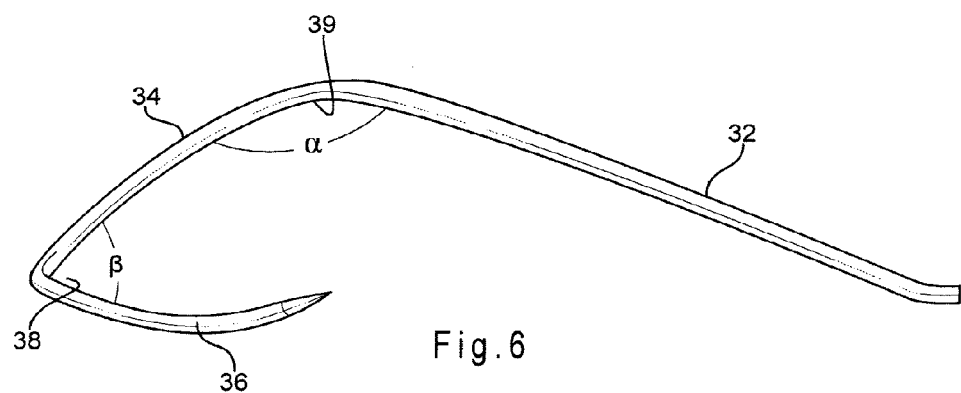
FIG. 6 is an isometric view of an embodiment of a hook member.

Hook members 30, 40, 50 may include different lengths. Hook members with different lengths allow the hook members to more easily move from a weedless configuration to an engaged configuration without interfering with each other. As shown in FIGS. 2, 3, and 6, the arm 34 and the engagement portion 36 of hook member 30 connect at an acute angle to form a valley 38. Similar valleys 48 and 58 may be present in hook members 40 and 50. A hook member length is defined by the maximum distance between the valley 38 and the base 12. In FIG. 1, hook member 30 has a greater length than hook member 40, and hook member 40 has a greater length than hook member 50.

In the weedless configuration, valleys 38, 48, and 58 are disposed adjacent or substantially on the axis 14. Similarly, hook ends or engagement points 37, 47, and 57 may be disposed adjacent to each other and adjacent or substantially on the axis 14 in the weedless configuration. The distance between hook ends 37, 47, 58 and base 12 may be approximately the same as the distance between bends 39, 49, 59 and base 12. The distance between hook ends 37, 47, 58 and base 12 may be between 90% and 110% of the distance between bends 39, 49, 59 and base 12.

The hook members 30, 40, 50 are preferably pivotally moveable through a plane defined in part by the central axis 14. This pivotally movement may be provided by the flexibility of the hook member material. Alternatively, the assembly 10 may include springs, hinges, tapered structures (see FIGS. 7 and 8) or similar structures to connect the hook members 30, 40, 50 to the base 12. The hook members 30, 40, 50 preferably move primarily with respect to the base 12, as opposed to the entire hook member flexing and changing in shape. In an embodiment, the hook members 30, 40, 50 are constrained such that they are pivotally moveable substantially only through a plane defined in part by the central axis 14. Additionally, the hook assembly 10 does not require any additional structures (such as the wire assembly and resilient body disclosed in U.S. Pat. No. 3,331,151) to hold the hook members 30, 40, 50 in place and/or provide for the pivotal movement of the hook members 30, 40, 50. In a preferred embodiment, the hook assembly 10 does not include any additional structures supporting the hook members 30, 40, 50 besides the base 12.

The hook members 30, 40, 50 may be biased such that an inwardly directed forced moves the assembly 10 from the weedless configuration to the engaged configuration, and when the inwardly directed force is removed, the assembly 10 returns to the weedless configuration. As shafts 32, 42, 52 are forced inwards, the engagement portions 36, 46, 56 extend outwards to form the engaged configuration. Portions of hook members 30, 40, 50 may generally pass through axis 14 as they move between configurations. The engagement portions 36, 46, 56 mention not only lodge in the fish's mouth, but because of the shape of the hook members 30, 40, 50, and the reverse force of the hook members 30, 40, 50, the individual hook members interlock between the fish's mouth and the other hook members. This interlocking feature holds the fish on the hook. The hook members 30, 40, 50 essentially lock down and will not release the fish until the angler removes it.

The fishing hook assembly 10 may be any suitable size, and the size may depend on what type of fish it is to be used for. The hook members 30, 40, 50 may be about 1 inch to about 2 inches in length. The maximum distance D1 between the shafts 32, 42, 52 and the central axis 14 may be at least 0.3 inches or 0.5 inches in the weedless configuration. The maximum distance D2 between the shafts 32, 42, 52 and the central axis 14 may be less than 0.1 inches or 0.2 inches in the fully engaged configuration.

The hook members 30, 40, 50 may also be from about 0.5 inches to about 1 inch in length. The maximum distance D1 between the shafts 32, 42, 52 and the central axis 14 may be at least 0.2 inches in the weedless configuration. The maximum distance D2 between the shafts 32, 42, 52 and the central axis 14 may be less than 0.1 inches in the fully engaged configuration.

Figure 4:
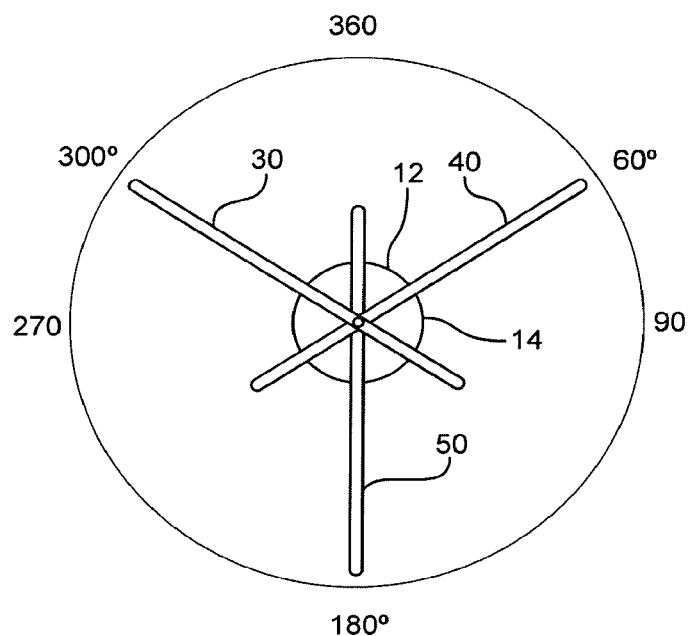
FIG. 4 is a bottom view of the fishing hook assembly of FIG. 1 in a weedless configuration.
Figure 5:
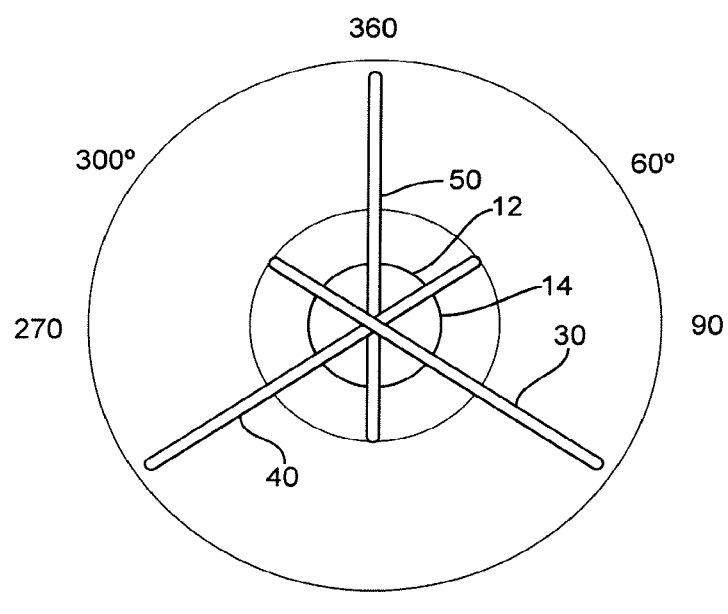
FIG. 5 is a bottom view of the fishing hook assembly of FIG. 1 in an engaged configuration.

As seen in FIGS. 4 and 5, the hook members 30, 40, 50 may be disposed around the central axis 14 in positions generally equidistant with respect to each other. In other words, if hook member 30 extends from the base 12 at the 300° position, then hook member 40 extends at the 60° position and hook member 50 extends at the 180° position, in the weedless configuration shown in FIG. 4. Similarly, as shown in the engaged configuration in FIG. 5, the hook members are dispose 120 apart around the central axis 14.

The fishing hook members 30, 40, 50 may be a variety of shapes. In one embodiment, fishing hook member 30 is generally j-shaped such as shown in FIG. 6. The shaft 32 and arm 34 connect at an obtuse angle α at bend 39. Angle α may be between 100° and 160°, preferably between 120° and 150°. The arm 34 and the engagement portion 36 of hook member 30 connect at an acute angle β to form a valley 38. It should be noted that arm 34 and the engagement portion 36 connect at a relatively sharp angle compared to conventional fishing hook shapes; in other words, the portions of arm 34 and engagement portion 36 adjacent valley 38 may be substantially straight, as opposed to curved. Angle β may be between 45° and 90°, preferably between 80° and 90°. Similar valleys 48 and 58 may be present in hook members 40 and 50.

Figure 7:
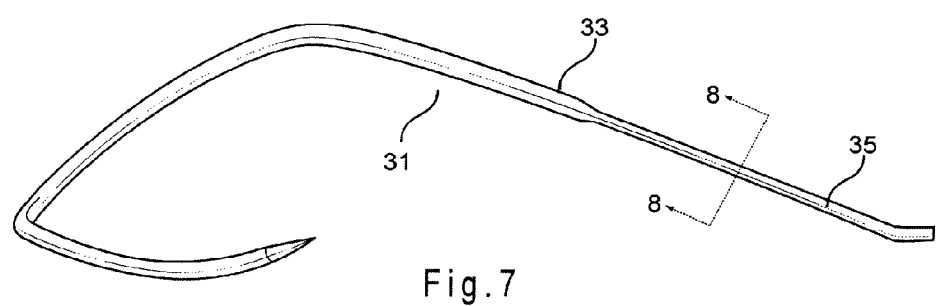
FIG. 7 is an isometric view of another embodiment of a hook member.
Figure 8:
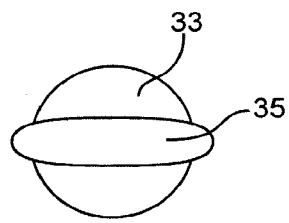
FIG. 8 is a cross-sectional view along line 8-8 of FIG. 7.
Figure 9:
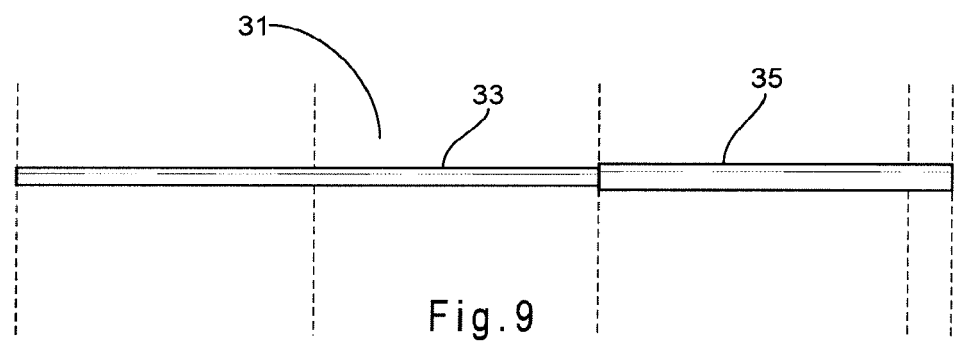
FIG. 9 is a top view of the hook member of FIG. 7.
Figure 10:
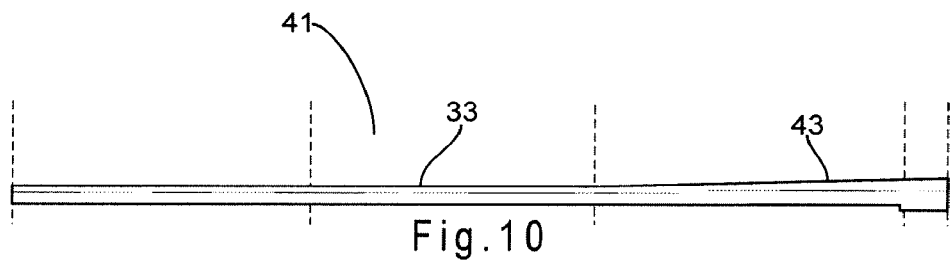
FIG. 10 is a top view of an alternative embodiment of the hook member of FIG. 7.

The hook members 30, 40, 50 may generally have circular or oval cross sections, but other cross sections are possible. As shown in FIGS. 7 and 8, a hook member 31 may include a generally circular cross section along the shaft 33 which tapers to a flat rectangular cross section along portion 35. The end of portion 35 is adapted to be connected to base 12. The flat cross section of portion 35 allows the hook member to preferentially pivot toward the axis 14 with respect to the base 12 and limit the tendency to bend in the lateral direction. A top view of the hook member 31 is shown in FIG. 9. It can be seen that flat rectangular cross section 35 may be somewhat wider than shaft 33. In an alternative embodiment, shown in FIG. 10, flat rectangular cross section 43 may taper from a width adjacent portion 33 to a wider width at the distal end. Such a tapered section may increase the flexibility of the hook while retaining sufficient structural strength.

Figure 11:
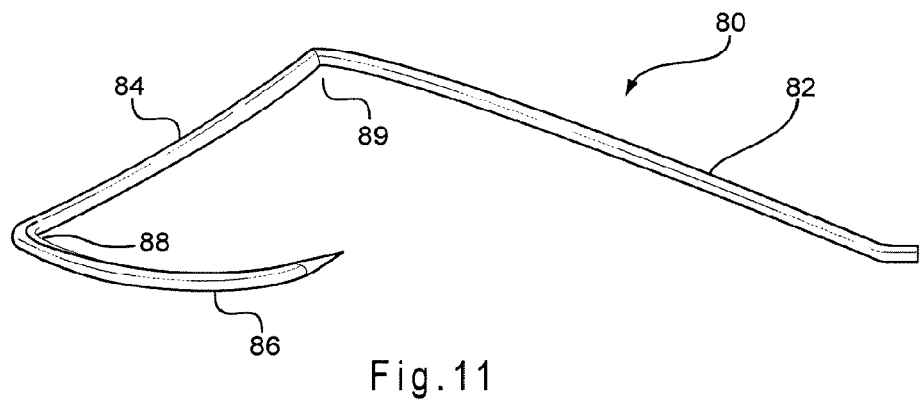
FIG. 11 is an isometric view of another hook member.

In FIG. 11, a hook member 80 includes a different shape than hook member 30. Hook member 80 includes a shaft 82 adapted to be connected to the base 12. An arm 84 is connected to the shaft 82 at bend 89 and forms an obtuse angle with the shaft 82. An engagement portion 86 is connected to the arm 84 at valley 88. The arm 84 and the engagement portion 86 connect at an acute angle such that the engagement portion 86 points towards the shaft 82 and base 12. The main difference between hook member 30 and hook member 80 is that arm 34 curves outwardly between bend 39 and valley 38, while arm 84 curves in the reverse direction, i.e. curves inwardly between bend 89 and valley 88. Hook member 80 provides increased holding power to maintain lock-down of the fish. The acute angle of the valley 88 may increase the strength of the lock-down feature. In particular, when the hook embeds into the fish's mouth, the hook may continue to penetrate the skin until the fish's mouth stops at the valley 88. This acute angle coupled with the reverse curvature of the "arm" may facilitate retaining the hook relatively more firmly between the valley 88 as compared to conventional hook members. Generally speaking, less movement within the valley 88 enables a lower likelihood that the fish disengages from the hook member 80. A conventional hook member possesses an increased curvature along the valley which allows the fish to slide freely along the curvature. Such an increased curvature in conventional hooks have been around for over a century and utilize one or more barb-like structures, which are characterized as sharp protruding points just below the hook point. The barbs tend to be oriented in the opposite direction to prevent the fish from slidably releasing from the barbs.

Unlike the conventional hook members, the hook members described herein may be structurally characterized by an absence of one or more barbs. Utilizing a hook member without barbs is advantageous over conventional barbed hooks for many reasons. For example, the majority of damage to a fish may be attributed to the piercing action of the hook member during the unhooking mechanism. Removing the fish from a barbed hook oftentimes requires a retrieval tool such pliers which may significantly bend the hook. Because barbs are designed not to release the captured fish, the barbs tend to cause considerable damage by the angler when twisting and wrenching it out from the barbed hook member. The barbs tend to tear flesh and bone while being pulled out. The struggle to remove barbed hooks can take considerable time, often several minutes for an inadequately hooked fish. Such prolonged time may decrease the likelihood that the fish survives when the hooks are released from the fish and the fish is thereafter returned to the water. Furthermore, the process of removing the fish from the barbed hook member may cause the hook to substantially bend and ultimately deform to the extent that the hook cannot be used again. Consequently, a multi-barbed hook member may be relatively more difficult to remove from the fish compared to a single hook.

The barbless hooks as described in the embodiments herein allow relatively quick, and simple release by the angler without substantially damaging the fish, thereby promoting a healthier fish population. Additionally, the overall geometry of the hook assembly 10 reduces the risk that the hook 10 will embed into the gullet (i.e., throat) of a captured fish.

Figure 12:
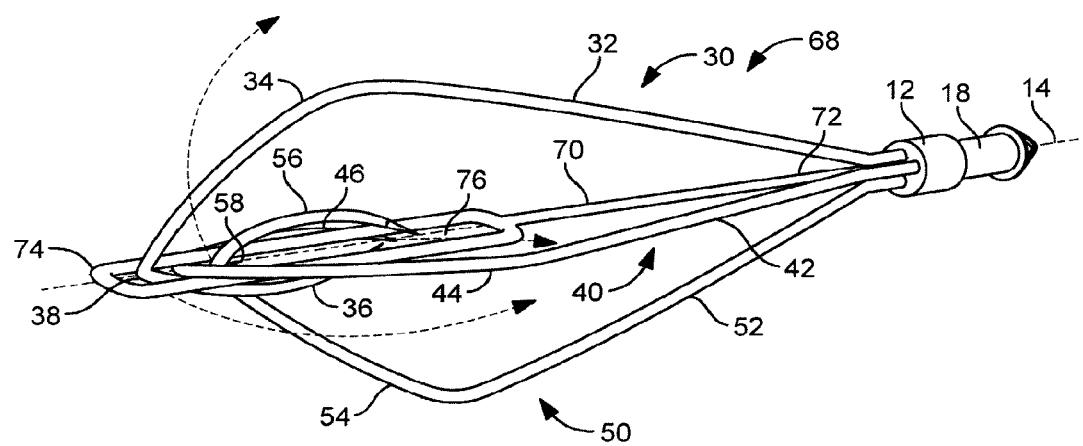
FIG. 12 is a perspective view of another fishing hook assembly.

FIG. 12 is a perspective view of another embodiment of a fishing hook assembly 68. Fishing hook assembly 68 is generally of the same design as previously described fishing hook assembly 10, with the addition of a longitudinally extending member 70. Longitudinally extending member 70 is disposed generally along the central axis 14. Longitudinally extending member 70 includes a proximal end 72 connected to the base and a distal end 74. Longitudinally extending member 70 includes a longitudinally extending slot 76 adjacent the distal end 74. The slot 76 is sufficiently wide enough to accommodate movement of all three hook members 30, 40, 50 between the two configurations. The engagement portions 36, 46, and 56 are preferably at least partially disposed within the slot 76 when the fishing hook assembly 68 is in the weedless configuration. The arms 34, 44, and 54 are preferably at least partially disposed within the slot 76 when the fishing hook assembly 68 is in the engaged configuration. The longitudinally extending member 70 provides additional structural support to the hook members 30, 40, and 50. The slot 76 also helps to guide the hook members 30, 40, and 50 so that they maintain the desired paths of travel. The ratio of the length of the slot to the length of the longitudinally extending member may be between 0.3 and 0.7. The distal end of slot 76 may be used to attach other accessories to the fishing hook assembly, such as plastic skirt assortments, feather assortments, a trailer hook option with trailer hook plastic trailer bait, and the like. Alternatively, the distal end 74 may include an additional loop (not shown) for attaching such devices. Further, longitudinally extending member 70 may provide additional attachment points along its length. This, hook assembly 68 allows the usage of both front and back end attachment points to attach accessories.

Figures 13, 14:
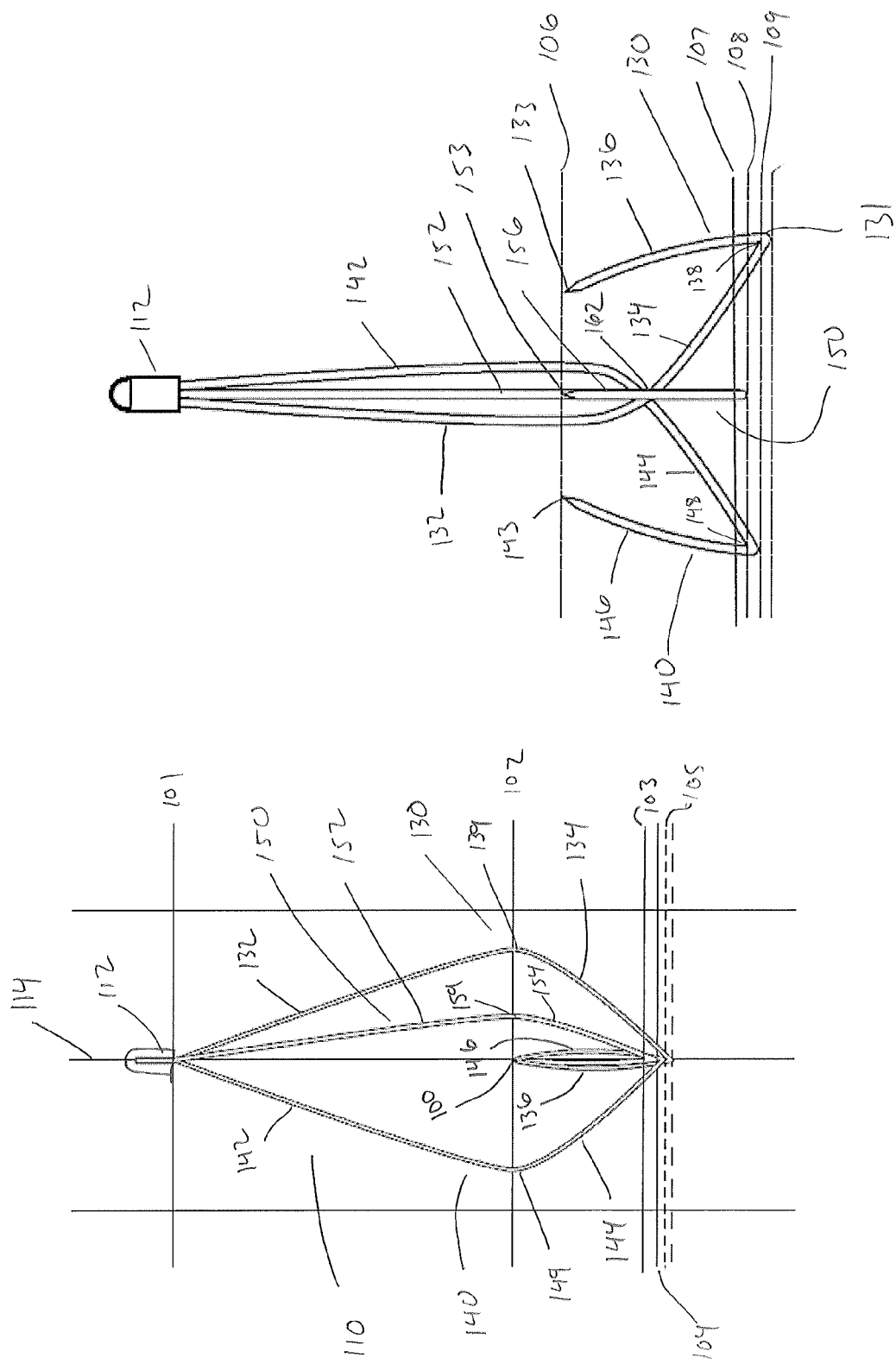
FIG. 13 is a perspective view of another embodiment of a fishing hook assembly in a weedless configuration.
FIG. 14 is a perspective view of the fishing hook assembly of FIG. 13 in an engaged configuration.

A third embodiment of a fishing hook assembly 110 is shown in FIG. 13. Fishing hook assembly 110 is similar to the previously described fish hook assembly 10 except for as disclosed below. The fishing hook assembly 110 includes a base 112 and a plurality of hook members 130, 140, 150. In a preferred embodiment, the device 110 includes three hook members, but other numbers are possible. A central axis 114 extends through the base 112. The hook members 130, 140, 150 are moveably connected to the base 112. The hook members 130, 140, 150 are preferably pivotally connected to the base 112. Further, the hook members 130, 140, 150 are preferably constrained such that they are pivotally moveable substantially only through a plane defined in part by the central axis 114. In a preferred embodiment, the hook assembly 110 does not include any additional structures supporting the hook members 130, 140, 150 besides the base 112. The fishing hook assembly 110 will be described in reference to planes 101, 102, 103, 104, 105, 106, 107, 108, and 109 which are disposed perpendicular to the axis 114.

Hook member 130 includes a shaft 132 connected in plane 101 to the base 112 and extending therefrom, and generally disposed a distance from the central axis 114. An arm 134 is connected to the shaft 132 at bend 139 and forms an obtuse angle with the shaft 132. An engagement portion 136 is connected to the arm 134 at a first end 131 of the engagement portion 136. A second end of the engagement portion 136 defines an engagement point 133. The arm 134 and the engagement portion 136 connect at an acute angle such that the engagement portion 136 is oriented generally towards the base 112. Similarly, hook member 140 includes shaft 142, arm 144, bend 149, engagement portion 146, and engagement point 143 and hook member 150 includes shaft 152, arm 154, bend 159, engagement portion 156, and engagement point 153. The engagement points 133, 143, 153 of each of the hook members are nearly touching and are disposed adjacent a single point 100 on the central axis 114 in the weedless configuration, as shown in FIG. 13.

Figures 15, 16:
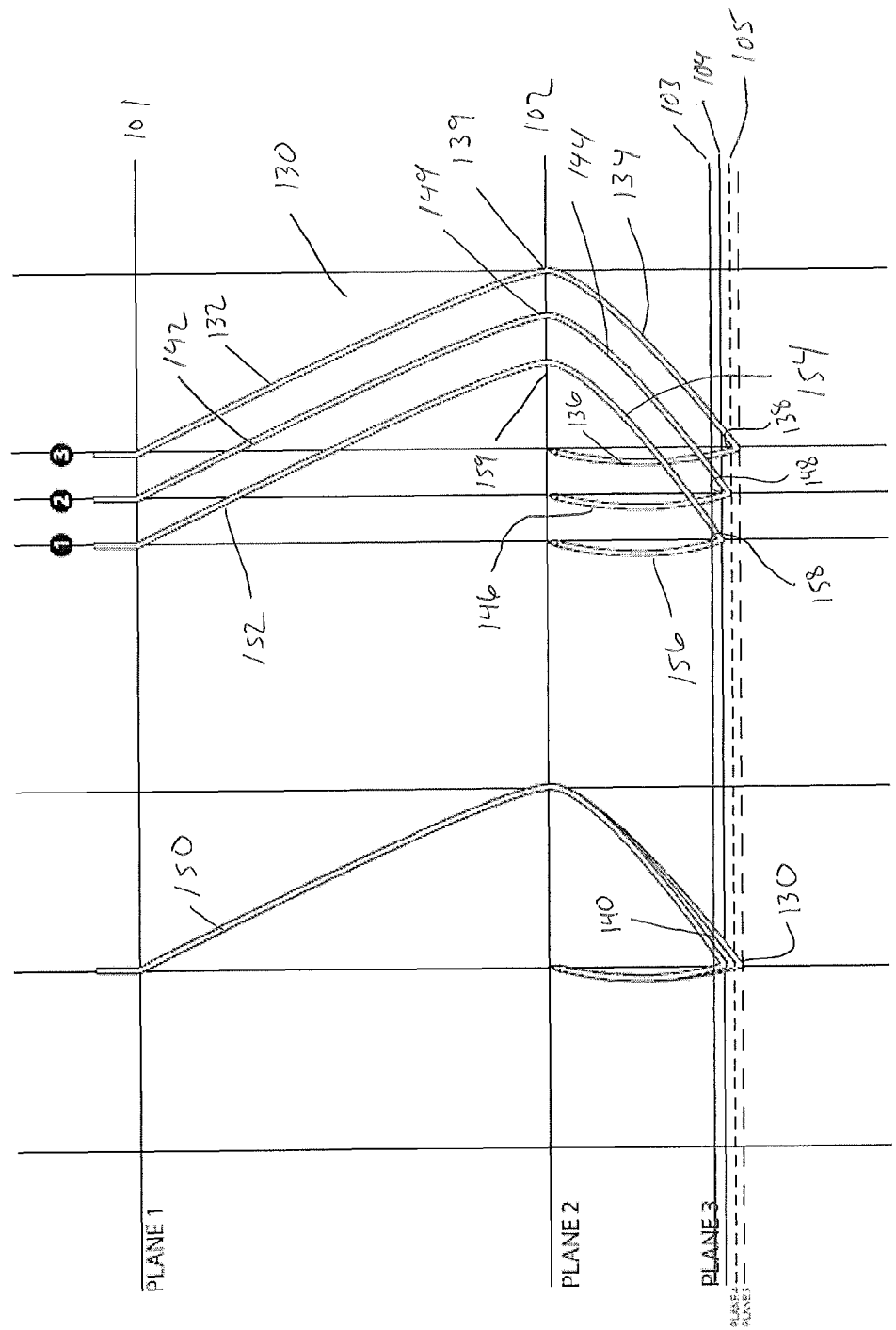
FIG. 15 is an isometric view of the hook members of the fishing hook assembly of FIG. 13 arranged on top of each other.
FIG. 16 is an isometric view of the hook members of FIG. 15 staggered apart.

As shown in FIGS. 14 and 16, the arm 134 and the engagement portion 136 of hook member 130 connect at an acute angle to form a valley 138. Similar valleys 148 and 158 are present in hook members 140 and 150. As best seen in FIGS. 15 and 16, the shafts 132, 142, 152 of the hook members preferably have substantially the same lengths, with the shaft length defined as the distance between the base 112 and the bend 139, 149, 159. The arms 134, 144, 154 of the hook members preferably have different lengths, with the arm length defined as the distance between the bend 139, 149, 159 and the respective valley 138, 148, 158. The engagement portions 136, 146, 156 of the hook members preferably have different lengths, with the engagement portions length defined as the distance between the valley 138, 148, 158 and the respective engagement point 133, 143, 153. Hook members with arms and engagement portions of different lengths allow the hook members to easily move from a weedless configuration to an engaged configuration without interfering with each other. Additionally, the precise configuration of the lengths and angles of the components of the hook members allow the hook assembly 110 to provide optimal positioning of the hook members in both the weedless configuration and the engaged configuration.

In one embodiment, the arm 134 is connected to the shaft 132 at a first obtuse angle, the arm 144 is connected to the shaft 142 at a second obtuse angle, and the arm 154 is connected to the shaft 152 at a third obtuse angle, wherein the first obtuse angle, the second obtuse angle, and the third obtuse angle are all different angles. Similarly, in an embodiment, the arm 134 is connected to the engagement portion 136 at a first acute angle, the arm 144 is connected to the engagement portion 146 at a second acute angle, and the arm 154 is connected to the engagement portion 156 at a third acute angle, wherein the first acute angle, the second acute angle, and the third acute angle are all different angles The hook assembly 110 is moveable from a first or weedless configuration (as shown in FIG. 13) to a second or engaged configuration (as shown in FIG. 14). As shown in FIG. 13, in the weedless configuration, bends 139, 149, and 159 are preferably substantially disposed in the same plane 102, which plane 102 is perpendicular to the axis 114. Further, valleys 138, 148, and 158 are disposed on or adjacent the central axis 114 in planes 105, 104, and 103 respectively. Engagement points 133, 143, and 153 may be disposed on or adjacent the axis 114 in the weedless configuration.

Using hook member 130 as an example, the tip 133 of engagement portion 136 is generally disposed on the central axis 114 in the weedless configuration and a distance from the central axis 114 in the engaged configuration. In the engaged configuration the shafts 132, 142, 152 are disposed in a tight configuration adjacent the central axis 14. As best seen in FIG. 14, in the engaged configuration, the shafts 132, 142, 152 are generally close to touching each other along their lengths, and may generally intersect around a point 162. Engagement points 133, 143, and 153 are disposed along plane 106, and valleys 138, 148, and 158 are disposed in different planes 109, 108, and 107 respectively.

The hook assembly 10, 68, or 110 may be made of any suitable material. The base 12 may be made of any suitable material. The hook members 30, 40, 50 are preferably made of a metal having sufficient strength to secure the hook members 30, 40, 50. The metal preferably has a good "memory" (such as a shape memory alloy like nickel-titanium) so that hook members will spring back to their original weedless configuration after being in the engaged configuration. The longitudinally extending member 70 may be made of plastic, metal, or any other suitable material. The fishing hooking assembly 10 may be constructed such that the weight is distributed along the central axis so that the assembly 10 has a horizontal fall. The base 12 and longitudinally extending member 70 (if present) may be made heavy to achieve the proper weight distribution. The fishing hook assembly may also be used with crank baits and other lures which will not require any weight added to the assembly 10.

In use, the assembly is attached to a line through eye 16 when utilized independently, or attached directly, and when attached to an artificial bait to replace its hook(s). Accessories, such as plastic skirt assortments, feather assortments, plastics resembling prey baitfish and creatures such as frogs, lizards, leeches, and the like, may be attached around surface 18. At rest, the assembly is in the weedless configuration shown in FIG. 1. The shaft 32, 42, 52 and arms 34, 44, 54 shield the engagement portions 36, 46, 56 from weeds and a user's skin. The assembly may optionally be baited on one or more the engagement portions 36, 46, 56, either with live bait or with artificial bait, such as plastic worms. In one example, the assembly 10 can accommodate bait by making one of the hooks 30, 40, 50 longitudinally longer and/or bigger relative to the other hooks such that space is created for attaching the bait therealong. Further, the assembly 10 may be attached to any conventional lure to provide a weedless presentation. The fisherman may then cast the assembly into the water. When an angler detects a strike, or bite, he yanks the fishing rod in snapping motion to embed the engagement portions of the fishing hook assembly 10 in the fish's mouth.

A feature of the fishing hook assemblies 10, 68, 110 is that the hook members 30, 40, 50 and 130, 140, 150 do not need barbs to work effectively. It may be difficult to unhook even a single barbed hook from a fish. Removing a treble hook can sometimes become difficult. A conventional treble hook can easily be bent out of shape while using pliers to remove the hooks. Attempts to remove a conventional treble hook by hand often end with impaling the angler's hands. With the fishing hook assemblies 10, 68, 110 the removal process is very easy. The angler merely presses in on the hook assembly 10, 68, or 110 to pop the barbless hook members 30, 40, 50 (or 130, 140, 15) free, which will disengage the hooks so that the angler may simply slide the fishing hook assemblies 10, 68, 110 from the fish's mouth.

The following example is provided by way of explanation and illustration. A fishing hook assembly of the design shown in FIG. 1 was used. The length of the assembly (from base to maximum length) was about 1.2 inches. The assembly was attached to a line and rigged with a night crawler worm. The assembly was cast into a weedy area and was found to be completely resistant to snagging the weeds. A bass engaged the worm and was successfully caught on the fishing hook assembly.

The foregoing description is not to be taken in a limiting sense. Although the embodiments have been described within the context of fishing, other uses beyond fishing for the hook assembly 10 are contemplated without deviating from the scope of the invention. For example, the hook assembly 10 may be utilized as a grappling hook that is designed to engage any type of target. The hook could engage any type of protuberance disposed along a surface of the target. Applications for such a grappling hook include, but are not limited to, rigging a ship or scaling a wall. Thus, although the present invention has been described with reference to preferred embodiments as they relate to fishing, changes may be made and formed in detail without departing from the spirit and scope of the invention. It is therefore intended that the foregoing detailed description be regarded as illustrative rather than limiting, and that it be understood that it is the following claims, including all equivalents, that are intended to define the scope of this invention.

What is claimed is:

1. A fishing hook assembly comprising:
   a base;
   a central axis extending through the base; and
   a first, second, and third hook member moveably connected to the base, wherein each hook member comprises:
   a shaft connected to the base and extending therefrom;
   an arm connected to the shaft at a bend and forming an obtuse angle with the shaft; and
   an engagement portion connected to the arm and comprising an engagement point, wherein the arm and the engagement portion connect at an acute angle;
   wherein each of the shafts of the hook members have a same length, and wherein a length of the arm of the first hook member is longer than a length of the arm of the second hook member, and the length of the arm of the second hook member is longer than a length of the arm of the third hook member, and wherein the hook assembly is moveable from a first configuration to a second configuration, wherein in the first configuration the engagement points of each of the hook members are nearly touching and are substantially disposed around a single point on the central axis and each of the bends of the hook members is substantially disposed in a same plane perpendicular to the central axis, and in the second configuration the shafts of each of the hook members are disposed in a tight configuration around the central axis such that the shafts are nearly touching and the arms extend outwardly from the central axis.

2. The fishing hook assembly of claim 1 wherein the hook members are pivotally connected to the base.

3. The fishing hook assembly of claim 2 wherein the hook members are constrained such that they are pivotally moveable substantially only through a plane defined in part by the central axis.

4. The fishing hook assembly of claim 1 wherein each hook member further comprises a valley disposed between the arm and the engagement portion, wherein in the first configuration the valleys are disposed adjacent to each other and each valley is oriented on the central axis.

5. The fishing hook assembly of claim 4 wherein in the second configuration, each valley is disposed in a different plane perpendicular to the central axis.

6. The fishing hook assembly of claim 1 wherein in the second configuration, each engagement point is disposed in the same plane perpendicular to the central axis and each bend is disposed adjacent the central axis.

7. The fishing hook assembly of claim 1 wherein the arm of the first hook member is connected to the shaft of the first hook member at a first angle, the arm of the second hook member is connected to the shaft of the second hook member at a second angle, and the arm of the third hook member is connected to the shaft of the third hook member at a third angle, wherein the first angle, the second angle, and the third angle are all different angles.

8. The fishing hook assembly of claim 1 wherein the arm of the first hook member is connected to the engagement portion of the first hook member at a first angle, the arm of the second hook member is connected to the engagement portion of the second hook member at a second angle, and the arm of the third hook member is connected to the engagement portion of the third hook member at a third angle, wherein the first angle, the second angle, and the third angle are all different angles.

9. The fishing hook assembly of claim 1 wherein the hook members are biased such that an inwardly directed force moves the assembly from the first configuration to the second configuration, and when the inwardly directed force is removed, the assembly returns to the first configuration.

10. The fishing hook assembly of claim 1 wherein the hook members are disposed around the central axis in positions generally equidistant with respect to each other.

11. The fishing hook assembly of claim 1 wherein at least one of the shafts comprises a portion with a flat cross section adjacent to the base to provide pivotal movement through a plane defined in part by the central axis.

12. A fishing hook assembly comprising:
a base;
a central axis extending through the base; and
a first, second, and third hook member moveably connected to the base, wherein the hook members are constrained such that they are pivotally moveable substantially only through a plane defined in part by the central axis, wherein each hook member comprises:
a shaft connected to the base and extending therefrom;
an arm connected to the shaft at a bend and forming an obtuse angle with the shaft; and
an engagement portion connected to the arm and comprising an engagement point, wherein the arm and the engagement portion connect at an acute angle and each hook member further comprises a valley disposed between the arm and the engagement portion;
wherein the hook assembly is moveable from a first configuration to a second configuration,
wherein in the first configuration, the engagement points of each of the hook members are nearly touching and are substantially disposed around a single point on the central axis; each of the bends of the hook members is substantially disposed in a same plane perpendicular to the central axis; and the valleys are disposed adjacent to each other and each valley is oriented on the central axis, and
wherein in the second configuration, the shafts of each of the hook members are disposed in a tight configuration around the central axis such that the shafts are nearly touching and the arms extend outwardly from the central axis; each engagement point is disposed in the same plane perpendicular to the central axis; each bend is disposed adjacent the central axis; and each valley is disposed in a different plane perpendicular to the central axis.

13. A fishing hook assembly comprising:
a base;
a central axis extending through the base; and
a first, second, and third hook member moveably connected to the base, wherein each hook member comprises:
a shaft connected to the base and extending therefrom and generally disposed a first distance from the central axis;
an arm connected to the shaft at a bend and forming an obtuse angle with the shaft; and
an engagement portion connected to the arm and comprising an engagement point, wherein the arm and the engagement portion connect at an acute angle to form a valley and define a length defined by the maximum distance between the valley and the base, and wherein the engagement portion is generally disposed a second distance from the central axis;
wherein the length of the first hook member is longer than the length of the second hook member, and the length of the second hook member is longer than the length of the third hook member, and wherein the hook assembly is moveable from a first configuration to a second configuration, wherein in the first configuration the hook members are disposed adjacent the central axis such that the first distance is greater than the second distance and the engagement points of each of the hook members are disposed adjacent to each other on the central axis, and in the second configuration the shafts are disposed in a tight configuration adjacent the central axis such that the shafts are nearly touching and the arms extend outwardly from the central axis, such that the first distance is less than the second distance, and wherein the hook members are constrained such that they are pivotally moveable substantially only through a plane defined in part by the central axis and the hook assembly does not include any additional structures supporting the hook members besides the base.

14. The fishing hook assembly of claim 13 wherein in the first configuration, the valleys are disposed substantially on the central axis.

15. The fishing hook assembly of claim 13 wherein in the second configuration, the bends are disposed substantially on the central axis.

16. The fishing hook assembly of claim 13 wherein the hook members are biased such that an inwardly directed force moves the assembly from the first configuration to the second configuration, and when the inwardly directed force is removed, the assembly returns to the first configuration.

17. The fishing hook assembly of claim 13 wherein the hook members are disposed in positions generally equidistantly with respect to each other.

18. The fishing hook assembly of claim 13 wherein at least one of the shafts comprises a portion with a flat cross section adjacent to the base to provide pivotal movement through a plane defined in part by the central axis.

19. The fishing hook assembly of claim 13 wherein each arm curves inwardly between the shaft and the engagement portion.

20. The fishing hook assembly of claim 13 wherein each arm curves outwardly between the shaft and the engagement portion.

* * * * *